US012352441B2

(12) United States Patent
Joshi et al.

(10) Patent No.: US 12,352,441 B2
(45) Date of Patent: Jul. 8, 2025

(54) REINFORCED FILM FLOATWALL FOR A GAS TURBINE ENGINE

(71) Applicant: RTX Corporation, Farmington, CT (US)

(72) Inventors: Dibesh D. Joshi, South Windsor, CT (US); Gary J. Dillard, Gainesville, FL (US); Albert K. Cheung, East Hampton, CT (US); Stephen K. Kramer, Cromwell, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/371,929

(22) Filed: Sep. 22, 2023

(65) Prior Publication Data

US 2025/0102146 A1 Mar. 27, 2025

(51) Int. Cl.
*F23R 3/00* (2006.01)
*F23R 3/60* (2006.01)

(52) U.S. Cl.
CPC ................ *F23R 3/002* (2013.01); *F23R 3/60* (2013.01); *F05D 2260/201* (2013.01); *F05D 2260/202* (2013.01); *F05D 2260/22141* (2013.01)

(58) Field of Classification Search
CPC .................................. F23R 3/002; F23R 3/60
See application file for complete search history.

(56) References Cited

U.S. PATENT DOCUMENTS 4,446,693 A 5/1984 Pidcock et al.
4,498,288 A * 2/1985 Vogt ........................ F23R 3/002 60/776

(Continued)

FOREIGN PATENT DOCUMENTS

EP 1528322 A2 5/2005
EP 3211319 A1 8/2017

(Continued)

OTHER PUBLICATIONS

Advisory Action dated Jul. 14, 2023; U.S. Appl. No. 16/884,397, 4 pages.

(Continued)

*Primary Examiner* — Lorne E Meade
(74) *Attorney, Agent, or Firm* — CANTOR COLBURN LLP

(57) ABSTRACT

An assembly for a combustor for a gas turbine engine, including: a plurality of heat shield panels attached to at least one combustor liner, each one of the plurality of heat shield panels including a panel portion and a first forward rail and a second rearward rail each extending from an outer surface of the panel portion, the panel portion including an inner surface opposite of the outer surface, the panel portion also includes a forward end and a rearward end, the forward end of the panel portion is axially forward of the rearward end of an adjacent heat shield panel of the plurality of heat shield panels such that a gap is defined between the outer surface of the panel portion of one heat shield panel of the plurality of heat shield panels and an inner surface of the panel portion of an adjacent heat shield panel of the plurality of heat shield panels, the panel portion also includes a plurality of apertures extending from the outer surface to the inner surface; and a plurality of cooling pins extending upwardly and away from the outer surface towards a surface of the at least one combustor liner.

19 Claims, 7 Drawing Sheets

(56) References Cited

U.S. PATENT DOCUMENTS

| | | | | |
|---|---|---|---|---|
| 4,567,730 | A | 2/1986 | Scott | |
| 4,695,247 | A | 9/1987 | Enzaki et al. | |
| 5,012,645 | A | 5/1991 | Reynolds | |
| 5,291,733 | A * | 3/1994 | Halila | F23R 3/60 60/753 |
| 6,029,455 | A | 2/2000 | Sandelis | |
| 6,408,628 | B1 | 6/2002 | Pidcock et al. | |
| 10,240,790 | B2 | 3/2019 | Eastwood et al. | |
| 10,344,977 | B2 | 7/2019 | Mulcaire et al. | |
| 11,248,791 | B2 * | 2/2022 | Porter | F02K 3/06 |
| 2007/0283700 | A1 | 12/2007 | Gerendas et al. | |
| 2008/0134683 | A1 | 6/2008 | Foale | |
| 2008/0264065 | A1 | 10/2008 | Gerendas | |
| 2010/0011775 | A1 | 1/2010 | Garry et al. | |
| 2010/0095679 | A1 | 4/2010 | Rudrapatna et al. | |
| 2015/0292741 | A1 | 10/2015 | Cunha et al. | |
| 2016/0290642 | A1 | 10/2016 | Kwoka et al. | |
| 2017/0009987 | A1 | 1/2017 | Mckinney et al. | |
| 2017/0241643 | A1 | 8/2017 | Mulcaire et al. | |
| 2017/0335716 | A1 | 11/2017 | Bergholz et al. | |
| 2017/0356653 | A1 | 12/2017 | Bagchi et al. | |
| 2018/0238546 | A1 | 8/2018 | Quach et al. | |
| 2018/0266686 | A1 | 9/2018 | Zelesky et al. | |
| 2018/0335211 | A1 | 11/2018 | Quach et al. | |
| 2020/0003423 | A1 | 1/2020 | Porter et al. | |
| 2021/0372616 | A1 | 12/2021 | Cheung | |

FOREIGN PATENT DOCUMENTS

| | | | |
|---|---|---|---|
| EP | 3916304 | A1 | 12/2021 |
| GB | 2298266 | A | 4/1995 |

OTHER PUBLICATIONS

EP Search Report for EP 21175644.0 dated Sep. 22, 2021, 11 pages.

Final Office Action dated Apr. 20, 2023; U.S. Appl. No. 16/884,397, 22 pages.

Final Office Action dated Aug. 17, 2022; U.S. Appl. No. 16/884,397, 16 pages.

Non-Final Office Action dated Dec. 20, 2022; U.S. Appl. No. 16/884,397, 19 pages.

Non-Final Office Action dated Feb. 24, 2022; U.S. Appl. No. 16/884,397, 14 pages.

Extended European Search Report corresponding to EP Application No. 24201096.5; Issue date, Jan. 9, 2025, 10 pages.

* cited by examiner

Reinforced Film Floatwall (REF) Cooling Architecture

OBL Panel

REINFORCED FILM FLOATWALL FOR A GAS TURBINE ENGINE

BACKGROUND

This disclosure relates generally to gas turbine engines, and more particularly to methods and apparatus for cooling wall structures of a combustor of a gas turbine engines.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

In one example, a combustor of a gas turbine engine may be configured and required to burn fuel in a minimum volume. Such configurations may place substantial heat load on a structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels.

A combustor in a gas turbine engine may be configured with a dual wall structure. The combustor, for example, may have a floating wall structure where a heat shield is attached to an exterior shell. Various types of such dual wall structures have various advantages. However, there is still room in the art for improvement. In particular, there is a need in the art for a wall structure with improved cooling characteristics. There is also a need in the art for a wall structure which is less susceptible to foreign matter (e.g., dirt, sand, etc.) accumulation on the heat shield within cooling cavities of the wall structure.

BRIEF DESCRIPTION

Disclosed is an assembly for a combustor for a gas turbine engine, including: a plurality of heat shield panels attached to at least one combustor liner, each one of the plurality of heat shield panels including a panel portion and a first forward rail and a second rearward rail each extending from an outer surface of the panel portion, the panel portion including an inner surface opposite of the outer surface, the panel portion also includes a forward end and a rearward end, the forward end of the panel portion is axially forward of the rearward end of an adjacent heat shield panel of the plurality of heat shield panels such that a gap is defined between the outer surface of the panel portion of one heat shield panel of the plurality of heat shield panels and an inner surface of the panel portion of an adjacent heat shield panel of the plurality of heat shield panels, the panel portion also includes a plurality of apertures extending from the outer surface to the inner surface; and a plurality of cooling pins extending upwardly and away from the outer surface towards a surface of the at least one combustor liner.

In addition to one or more of the features described above, or as an alternative to any of the foregoing embodiments, the at least one combustor liner is formed from any one the following metals: nickel (Ni), aluminum (Al), titanium (Ti), steel, cobalt (Co) and/or an alloy of one the foregoing metals.

In addition to one or more of the features described above, or as an alternative to any of the foregoing embodiments, the plurality of heat shield panels form a shingled and/or stepped hollow dual-walled structure.

In addition to one or more of the features described above, or as an alternative to any of the foregoing embodiments, the at least one combustor liner is formed from a ceramic matrix composite (CMC) material.

In addition to one or more of the features described above, or as an alternative to any of the foregoing embodiments, the plurality of heat shield panels and the at least one combustor liner extend circumferentially about a central longitudinal axis of a gas turbine engine.

In addition to one or more of the features described above, or as an alternative to any of the foregoing embodiments, the plurality of heat shield panels are removably mounted to the at least one combustor liner by one or more attachment mechanisms.

In addition to one or more of the features described above, or as an alternative to any of the foregoing embodiments, the one or more attachment mechanisms are integrally formed with a respective one of the plurality of heat shield panels.

In addition to one or more of the features described above, or as an alternative to any of the foregoing embodiments, the combustor defines a combustion chamber, the combustion chamber includes a combustion area within the combustion chamber, the plurality of heat shield panels partially enclose the combustion area within the combustion chamber of the combustor.

In addition to one or more of the features described above, or as an alternative to any of the foregoing embodiments, the first forward rail is located rearward from the forward end and the second rearward rail is located forward from the rearward end.

In addition to one or more of the features described above, or as an alternative to any of the foregoing embodiments, the first forward rail is located closer to the forward end than the second rearward rail and the second rearward rail is located closer to the rearward end than the first forward rail.

In addition to one or more of the features described above, or as an alternative to any of the foregoing embodiments, the first forward rail and the second rearward rail are formed integrally with each heat shield panel of the plurality of heat shield panels such that they are formed as a single unitary structure.

In addition to one or more of the features described above, or as an alternative to any of the foregoing embodiments, the first forward rail and the second rearward rail are interconnected by side rails that extend axially along the panel portion.

In addition to one or more of the features described above, or as an alternative to any of the foregoing embodiments, the side rails are located at peripheral edge portions of the panel portion.

In addition to one or more of the features described above, or as an alternative to any of the foregoing embodiments, the side rails have a varying height with respect to the outer surface of the panel portion.

In addition to one or more of the features described above, or as an alternative to any of the foregoing embodiments, the plurality of cooling pins do not extend all the way to an inner surface of the at least one combustor liner.

In addition to one or more of the features described above, or as an alternative to any of the foregoing embodiments, the second rearward rail extends further from the outer surface of the panel portion in a radial direction than the first forward rail such that when each one of the plurality of heat shield panels is secured to the at least one liner the panel portion is inclined with respect to the at least one liner such that the rearward end of the panel portion is further from the liner than the forward end of the panel portion.

Also disclosed is a gas turbine engine, including: a compressor section; a combustor fluidly connected to the compressor section; a turbine section fluidly connected to the combustor, the combustor comprising; and an assembly, including: a plurality of heat shield panels attached to at least one combustor liner, each one of the plurality of heat shield panels including a panel portion and a first forward rail and a second rearward rail each extending from an outer surface of the panel portion, the panel portion including an inner surface opposite of the outer surface, the panel portion also includes a forward end and a rearward end, the forward end of the panel portion is axially forward of the rearward end of an adjacent heat shield panel of the plurality of heat shield panels such that a gap is defined between the outer surface of the panel portion of one heat shield panel of the plurality of heat shield panels and an inner surface of the panel portion of an adjacent heat shield panel of the plurality of heat shield panels, the panel portion also includes a plurality of apertures extending from the outer surface to the inner surface; and a plurality of cooling pins extending upwardly and away from the outer surface towards a surface of the at least one combustor liner.

In addition to one or more of the features described above, or as an alternative to any of the foregoing embodiments, the plurality of heat shield panels and the at least one combustor liner extend circumferentially about a central longitudinal axis of a gas turbine engine.

In addition to one or more of the features described above, or as an alternative to any of the foregoing embodiments, the second rearward rail extends further from the outer surface of the panel portion in a radial direction than the first forward rail such that when each one of the plurality of heat shield panels is secured to the at least one liner the panel portion is inclined with respect to the at least one liner such that the rearward end of the panel portion is further from the liner than the forward end of the panel portion.

Also disclosed is a method for cooling an inner surface of a heat shield of a combustor of a gas turbine engine, including: securing a plurality of heat shield panels to at least one combustor liner of the combustor to form the heat shield, each one of the plurality of heat shield panels including a panel portion and a first forward rail and a second rearward rail each extending from an outer surface of the panel portion, the panel portion including an inner surface opposite of the outer surface, the panel portion also includes a forward end and a rearward end, the forward end of the panel portion is axially forward of the rearward end of an adjacent heat shield panel of the plurality of heat shield panels such that a gap is defined between the outer surface of the panel portion of one heat shield panel of the plurality of heat shield panels and an inner surface of the panel portion of an adjacent heat shield panel of the plurality of heat shield panels, the panel portion also includes a plurality of apertures extending from the outer surface to the inner surface; and a plurality of cooling pins extending upwardly and away from the outer surface towards a surface of the at least one combustor liner.

In addition to one or more of the features described above, or as an alternative to any of the foregoing embodiments, the second rearward rail extends further from the outer surface of the panel portion in a radial direction than the first forward rail such that when each one of the plurality of heat shield panels is secured to the at least one liner the panel portion is inclined with respect to the at least one liner such that the rearward end of the panel portion is further from the liner than the forward end of the panel portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
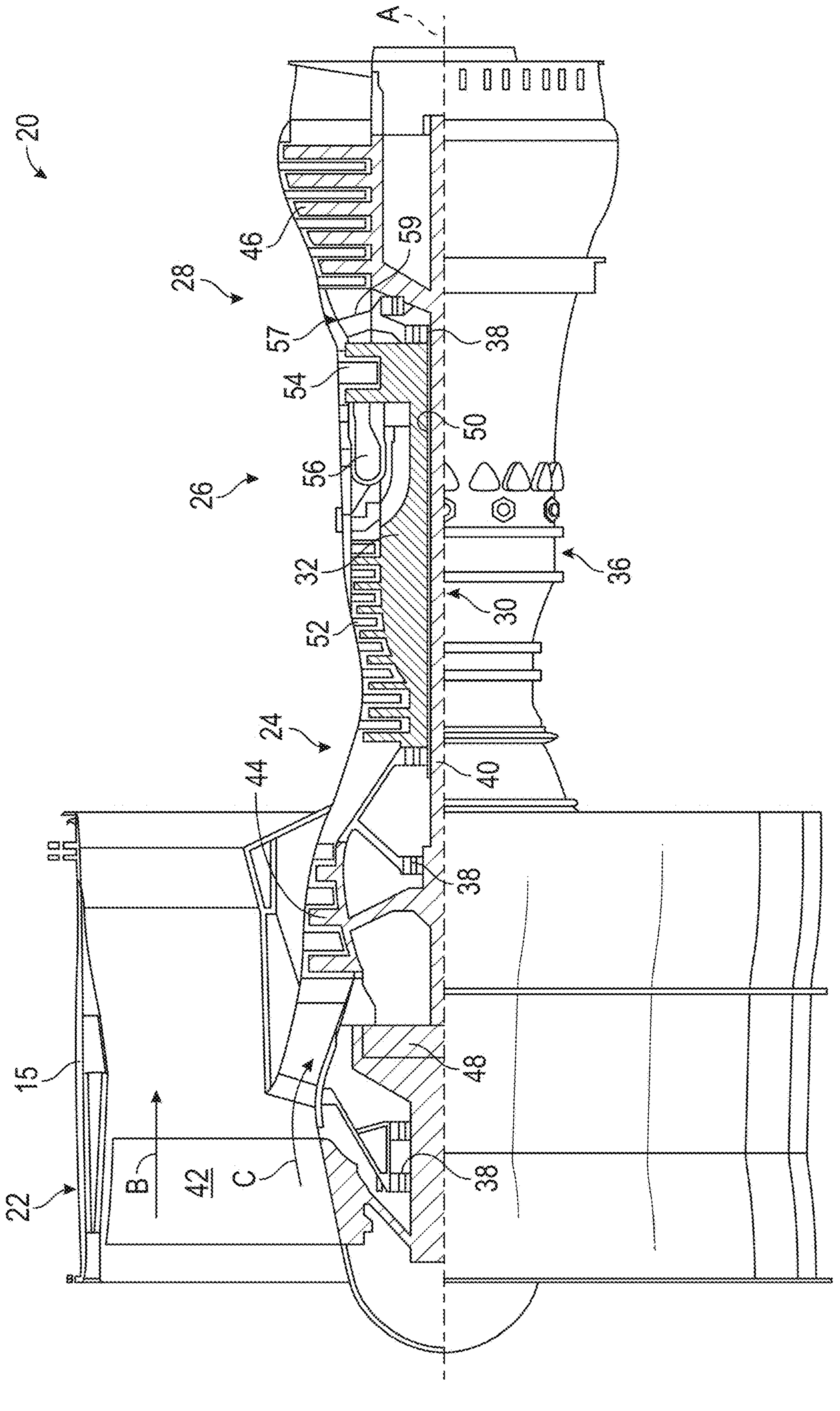
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. The geared architecture 48 may be an epicycle gear train, such as a planetary gear system or other gear system, with a gear reduction ratio. It should be understood, however, that the geared architecture engine and that the present disclosure is applicable to other gas turbine engines including direct drive turbofans.

Figure 2:
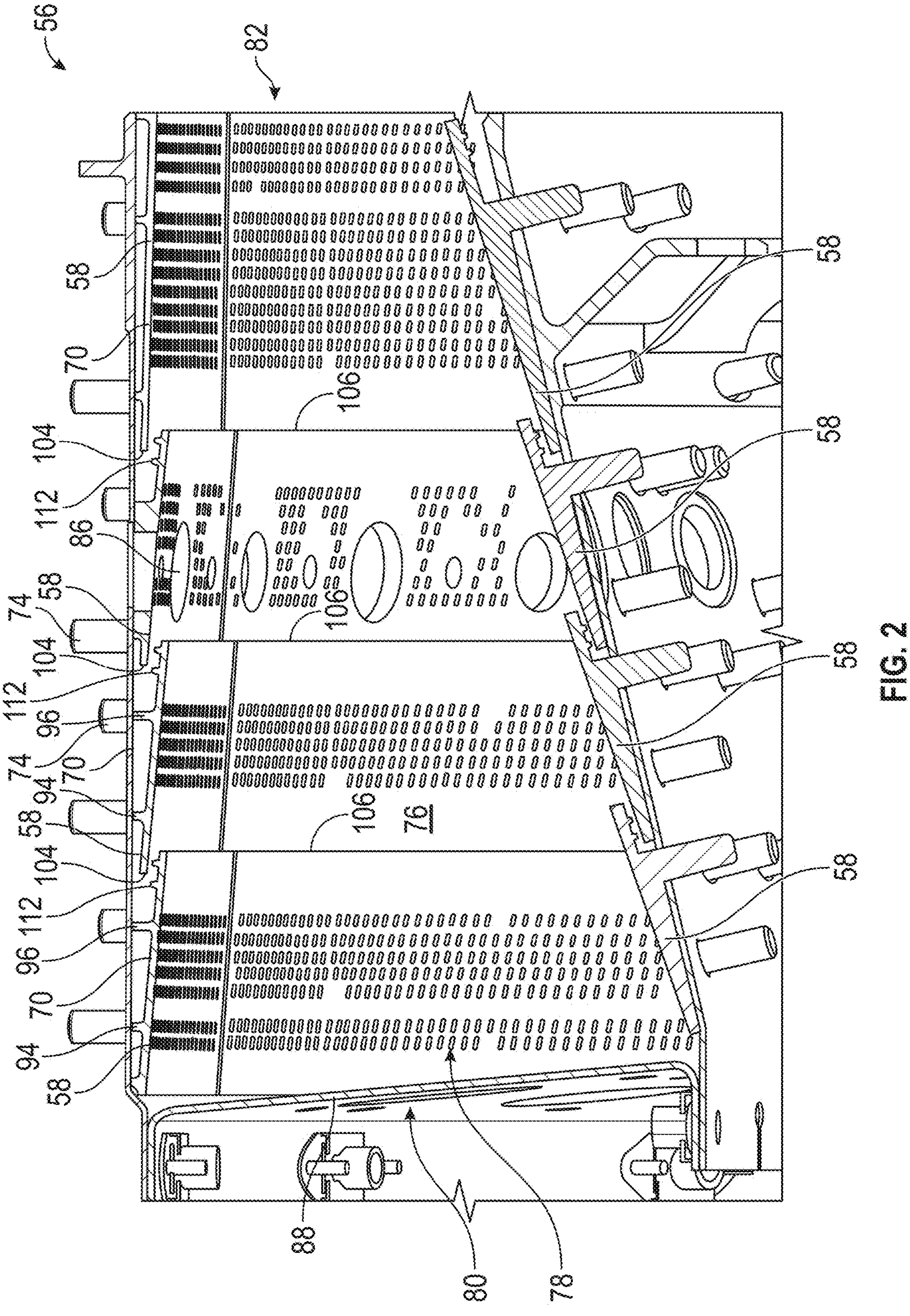
FIG. 2 is a cross-sectional view of a portion of a combustor of the gas turbine engine in accordance with the present disclosure.
Figure 4:
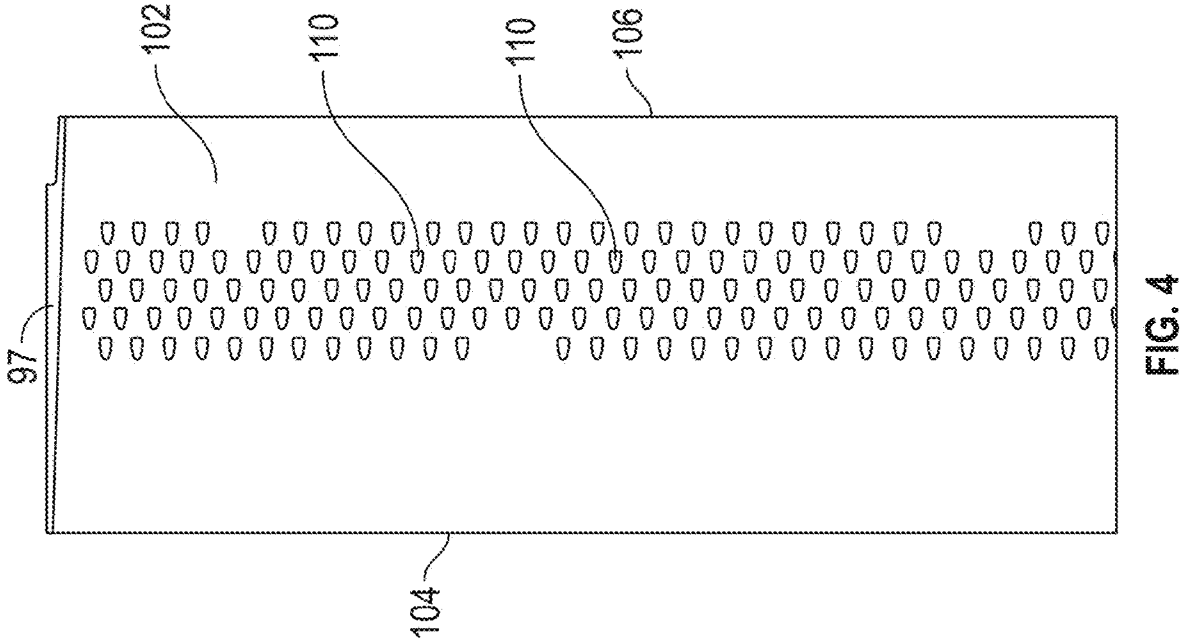
FIG. 4 is a bottom view of a heat shield panel of the combustor in accordance with the present disclosure.
Figure 3:
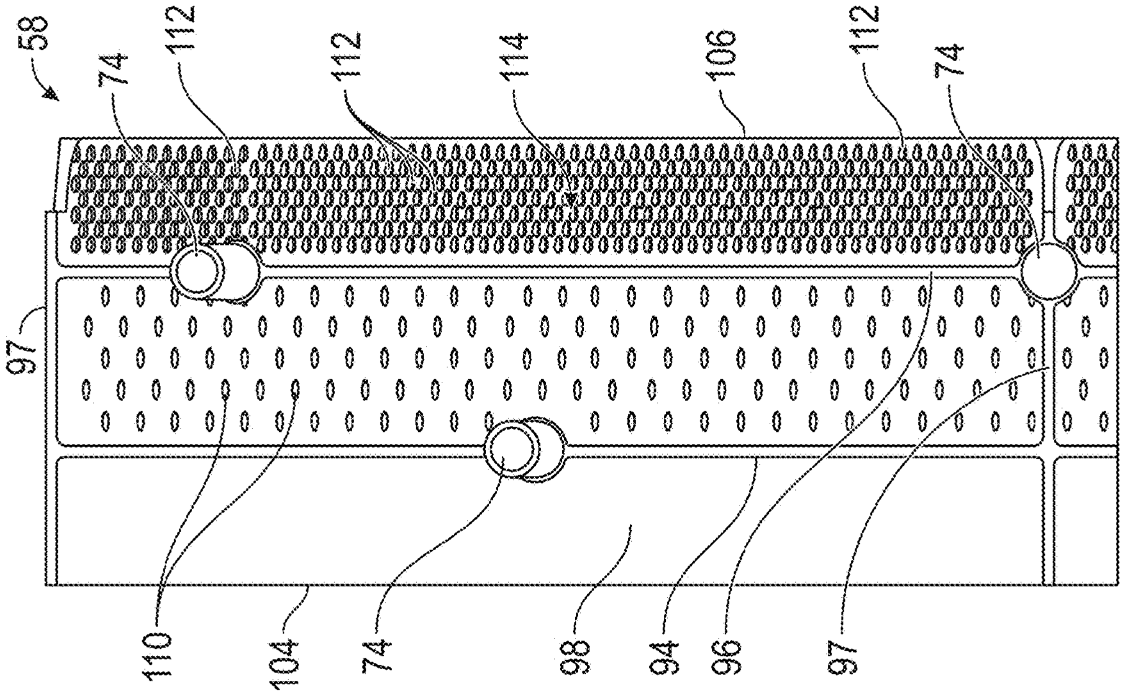
FIG. 3 is a top view of a heat shield panel of the combustor in accordance with the present disclosure.

Referring now to FIGS. 2-13, and with continued reference to FIG. 1, a portion of the combustor section 26 of the gas turbine engine 20 is illustrated. As illustrated in FIG. 2, the combustor 56 includes multiple heat shield panels or combustor panels 58 that each are attached to at least one combustor liner 60 or a plurality of combustor liners 60, which may also be referred to as an impingement sheet. Multiple combustor liners 60 and heat shield panels 58 may be used to form the periphery or outer perimeter of the combustor 56. This may also be referred to an impingement film floatwall (IFF) assembly or assembly 62 when combined with impingement passages and effusion passages.

The impingement film floatwall (IFF) assembly or assembly 62 includes a multi-walled structure 64 such as, for example, a shingled and/or stepped hollow dual-walled structure. For ease of description, the multi-walled structure is described as a wall of the combustor 56 of the gas turbine engine 20. The present disclosure, however, is not limited to such an exemplary combustor application. For example, the multi-walled structure 64 may alternatively be configured as a duct wall or any other multi-walled structure outside of the gas turbine engine combustor 56.

As mentioned above, the multi-walled structure 64 includes combustor liners 60 and heat shield panels 58. The multi-walled structure 64 also includes one or more internal cooling cavities 70.

The combustor liners 60 may be constructed from or otherwise include metal or non-metallic material (e.g., sheet material) that can meet the thermal and structural design requirements. The metal may include, but is not limited to, nickel (Ni), aluminum (Al), titanium (Ti), steel, cobalt (Co) and/or an alloy of one or more of the foregoing metals. The non-metallic material may be ceramic such as, but is not limited to, ceramic matrix composite (CMC) material; e.g., SiC/SiC. The present disclosure, however, is not limited to the foregoing exemplary liner materials, nor to metal liners.

The heat shield panels 58 and the combustor liners 60 extend circumferentially about (e.g., completely around) the engine central longitudinal axis A. The heat shield panels 58 form a heat shield 72 that extends longitudinally (e.g., generally axially along the axial centerline.

The heat shield 72 includes/is formed by a plurality of shingled arrays of heat shield panels 58. The heat shield panels 58 in each respective array are arranged circumferentially end-to-end so as to provide the heat shield 72 with a full hoop segmented body. The heat shield 72 and one or some or each of its heat shield panels 58 may be construct from metal and/or ceramic. The metal may include, but is not limited to, nickel (Ni), aluminum (Al), titanium (Ti), steel, cobalt (Co), beryllium (Be) and/or an alloy of one or more of the foregoing metals. The ceramic may include, but is not limited to, ceramic matrix composite (CMC) material; e.g., SiC/SiC. The present disclosure, however, is not limited to the foregoing exemplary heat shield materials, nor to metal nor ceramic heat shields/panels. The heat shield 72 and its panels 58 can also have a layer of thermal barrier coating (TBC) for additional protection.

In one non-limiting embodiment, the combustor liner 60 is formed from an Inconel alloy or the same alloy as the heat shield panels 58 and could be coated or uncoated. If coated, the heat shield panels 58 may also be formed from an Inconel alloy that is coated with an electron beam physical vapor deposition (EBPVD) ceramic coating. Of course, other equivalent materials and coatings are considered to be within the scope of the present disclosure.

As used herein, radially inward refers to a direction towards the engine central longitudinal axis A and radially outward refers to a direction away from the engine central longitudinal axis A. As such, radially inward liners 60 are closer to the engine central longitudinal axis A than the radially outward liners 60, when the combustor 56 is installed in the gas turbine engine 20.

The heat shield panels 58 can be removably mounted to the combustor liners 60 by one or more attachment mechanisms 74. In one non-limiting embodiment, the attachment mechanisms 74 may be a bolt or other structure that may extends from the respective heat shield panel 58 to and through a receiving portion or aperture of the combustor liner 60 such that the heat shield panel 58 may be attached to the combustor liner 60 and held in place.

In some embodiments, the attachment mechanism 74 may be integrally formed with a respective heat shield panel 58, although other configurations are possible. In some embodiments, the attachment mechanism 74 may be a bolt or other structure that may extend from the respective heat shield panel 58 to a receiving portion or aperture of the combustor liner 60 such that the heat shield panel 58 may be attached to the combustor liner 60 and held in place.

The combustor 56 defines a combustion chamber 76. The combustion chamber 76 includes a combustion area 78 within the combustion chamber 76. The heat shield panels 58 partially enclose the combustion area 78 within the combustion chamber 76 of the combustor 56. The combustor 56 includes an inlet 80 and an outlet 82 through which air may pass. The air may be supplied to the combustor 56 by a pre-diffuser. Air may also enter the combustion area 78 of the combustion chamber 76 through other holes in the combustor 56 including but not limited to quench holes 86.

The combustor 56 also includes a forward bulkhead portion 88 secured to at least the liners 60. The forward bulkhead portion 88 may also include a heat shield panel as well.

Figure 7:
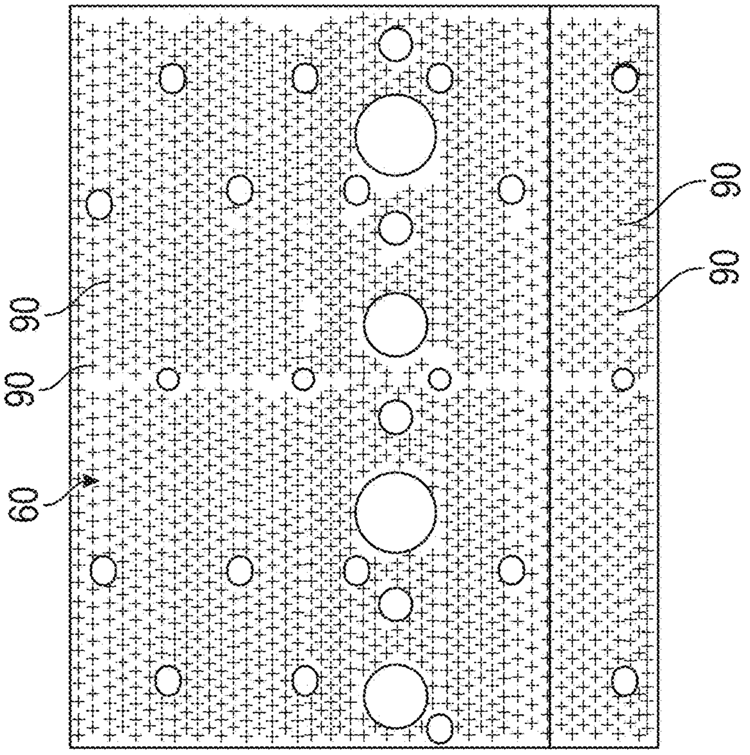
FIG. 7 is a view of a combustor liner in accordance with the present disclosure.
Figure 12:
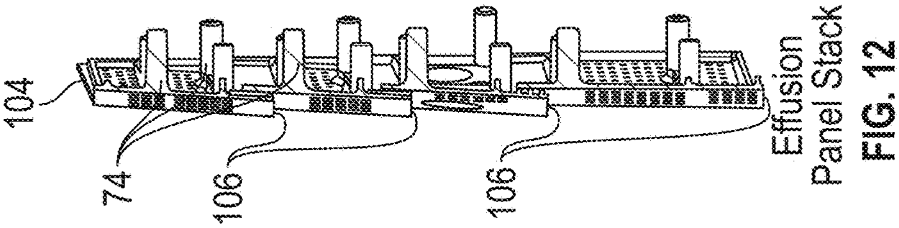
FIG. 12 is a side view of the plurality of heat shields illustrated in FIG. 11.
Figure 11:
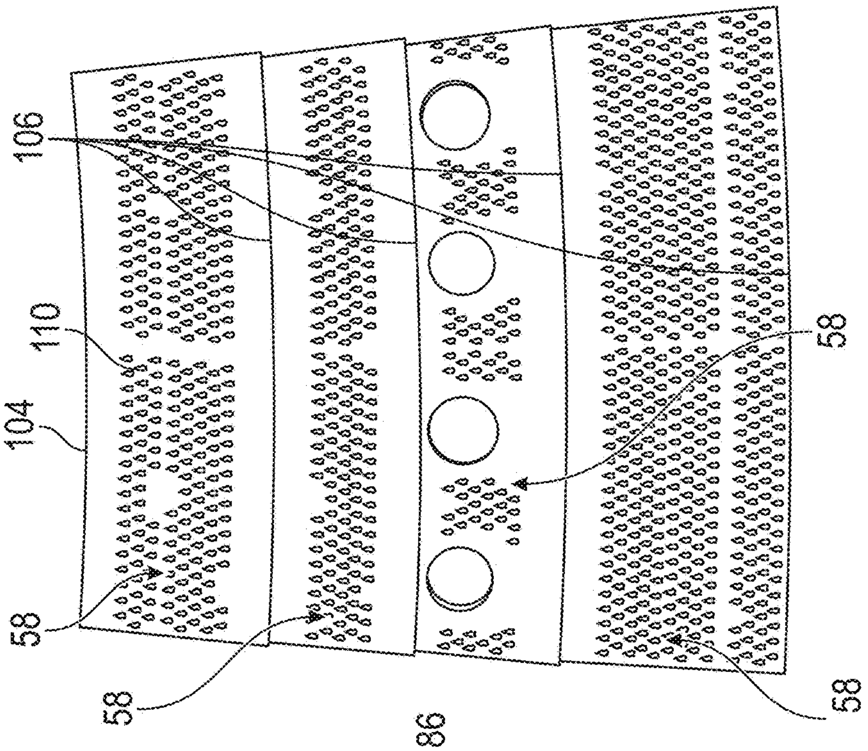
FIG. 11 is a view of a plurality of heat shields in accordance with the present disclosure.
Figure 10:
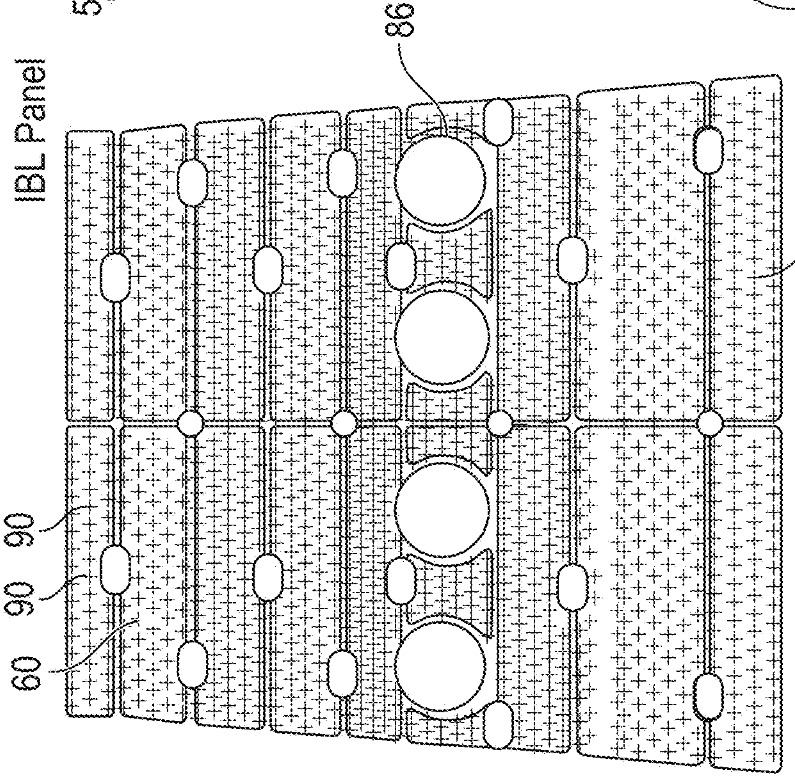
FIG. 10 is a view of a combustor liner in accordance with the present disclosure.

Each liner 60 includes a plurality of openings or impingement openings 90 which allow for air flow in the direction of arrows 92 into cooling cavities 70. In FIGS. 7 and 10, the location of the openings or impingement openings 90 are illustrated by a "+". Each heat shield 58 also includes a first forward rail 94 and a second rearward rail 96 each extending from an outer surface or first surface 98 of a panel portion 100 of the heat shield 58. The panel portion 100 also includes an inner surface or second surface 102 opposite of the outer surface 98. The panel portion 100 also includes a forward end 104 and a rearward end 106.

As illustrated and in one non-limiting embodiment, the second rearward rail 96 extends further from the outer surface 98 of the heat shield 58 in a radial direction than the first forward rail 94 such that when the heat shield 58 is secured to the liner 60 via attachment mechanisms 74 the panel portion 100 is inclined with respect to the liner 60 such that the rearward end 106 of the panel portion 100 of the heat shield 58 is further from the liner 60 than the forward end 104 of the panel portion 100. In addition, the first forward rail 94 is located rearward from the forward end 104 and the second rearward rail 96 is located forward from the rearward end 106. Still further, the first forward rail 94 is located closer to the forward end 104 than the second rearward rail 96. In addition, the second rearward rail 96 is located closer to the rearward end 106 than the first forward rail 94. It is, of course, understood that in other embodiments the first forward rail 94 and the second rearward rail 96 may have the same height (See FIG. 13). As used herein forward and rearward is intended to refer to the engine central longitudinal axis A illustrated in at least FIG. 1. In other words, the first forward rail 94 is closer to the fan section 22 of the engine 20 than the second rearward rail 96 when they are secured to the combustor 56 and the combustor 56 is secured to the engine 20.

In one non-limiting embodiment, the first forward rail 94 and the second rearward rail 96 are formed integrally with the heat shield 58 such that they are formed as a single unitary structure or alternatively the first forward rail 94 and the second rearward rail 96 may be separately secured to the heat shield 58.

In addition and in yet another non-limiting embodiment, the first forward rail 94 and the second rearward rail 96 may be interconnected by side rails 97 that extend axially along the panel portion 100 of the heat shield 58. The side rails 97 may be located at peripheral edge portions of the panel portion of the heat shield 58 as well as inboard portions (away from the peripheral edges) of the panel portion 100 of the heat shield 58. In one embodiment, the side rails 97 may have a varying height with respect to the outer surface 98 of the panel portion 100 of the heat shield 58. In other words, the height of the side rails 97 with respect to the outer surface 98 of the panel portion 100 of the heat shield 58 corresponds to the height of the first forward rail 94 and the second rearward rail 96 with respect to the outer surface 98 of the panel portion 100 of the heat shield 58. The side rails 97 may either extend all the way to the inner or first surface 117 of the combustor liner 60 or be spaced therefrom so there is a gap between the top of the side rails and the first or inner surface 117 of the combustor liner 60.

It being understood that in FIG. 2, the first forward rail 94 and the second rearward rail 96 are not illustrated in the cross-sectional portion of the heat shields 58 located in the lower portion of the combustor 56 being illustrated in FIG. 2. This being due to the cross-sectional plane of these heat shields 58 being located in the side rail 97.

In addition and as each of the heat shields 58 are secured to the liner 60 via attachment mechanisms 74, the forward end 104 of the panel portion 100 is axially forward of the rearward end 106 of an adjacent heat shield 58 such that a gap 108 is defined between the outer surface 98 of the panel portion 100 of one heat shield and an inner surface 102 of the panel portion 100 of an adjacent heat shield 58.

In addition, at least some of the heat shields 58 also have a plurality of apertures or effusion holes 110 extending from the outer surface 98 to the inner surface 102. In particular, the plurality of apertures or effusion holes 110 may comprise shaped effusion outlets 110 such that effusion cooling is provided on the outer surface 98 of the heat shield proximate or downstream from the apertures 110. The effusion hole can be cylindrical holes or shaped holes. The effusion outlet configuration can be similar to one shown in at least FIG. 4 or 8. For example, the outlet opening may have a tapered or wider distal end as it opens onto the inner surface 102. Of course, the above configurations are intended to provide examples and the various embodiments of the present disclosure are not intended to be limited to the specific effusion outlets 110 described above or illustrated in the attached FIGS. In one embodiment, the apertures 110 are located in the panel portion 100 of the heat shield 58 in between the first forward rail 94 and the second rearward rail 96.

Still further, at least some of the heat shields 58 also have a plurality of a plurality of cooling pins or cooling protrusions 112 that extend upwardly and away from the outer surface 98 of the panel portion 100 of the heat shield towards the liner 60. The plurality of pins 112 are separated from each other to define a pin-fin array 114 illustrated in at least FIG. 3. The pins 112 of the pin-fin array 114 will slow down a cross flow velocity of the air traveling in the direction of arrow 116. As such, this will promote deposition of particulate entrained within the air on the surface of the heat shield 58 that has the plurality of pins or protrusions 112 extending therefrom. The particulate may include but is not limited to dirt, smoke, soot, volcanic ash, or similar airborne particulates known to one of skill in the related art. The pin arrangement 114 also increases the wetted surface for evaporative cooling of the heat shield 58 and promotes the heat extraction while air flows in the direction of arrow 116. In one non-limiting embodiment, the plurality of pins or protrusions 112 are formed integrally with the heat shield 58 such that they are formed as a single unitary structure or alternatively the pins or protrusions 112 may be separately secured to the heat shield 58.

As illustrated and in one embodiment, the plurality of pins 112 do not extend all the way to an inner or first surface 117 of the combustor liner 60. In other words, there is a gap between the top of the plurality of pins 112 and the first or inner surface 117 of the combustor liner 60. Alternatively, the plurality of pins or some of the plurality of pins 112 may extend all the way to the inner or first surface 117 of the combustor liner 60. In addition, and in one embodiment, the first forward rail 94 and the second rearward rail 96 do not extend all the way to the inner or first surface 117 of the combustor liner 60. In other words, there is a gap between the top of the first forward rail 94 and the second rearward rail 96 and the first or inner surface 117 of the combustor liner 60. This gap between the top of the first forward rail 94 and the second rearward rail 96 and the first or inner surface 117 of the combustor liner 60 will allow cooling air to pass between the top of the first forward rail 94 and/or the second rearward rail 96 and the first or inner surface 117 of the combustor liner 60. See for example, arrows 121. Alternatively, the first forward rail 94 and the second rearward rail 96 or a portion thereof may extend all the way to the inner or first surface 117 of the combustor liner 60.

Figure 6:
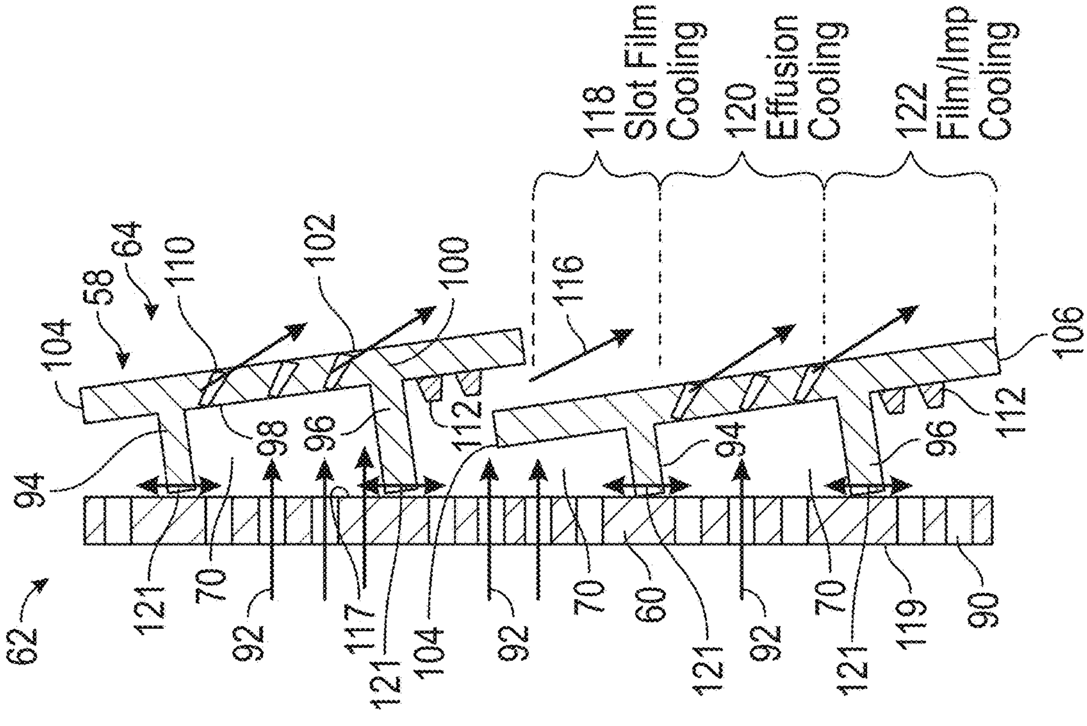
FIG. 6 is a cross-sectional view of a portion of a combustor of the gas turbine engine in accordance with the present disclosure illustrating cooling air flow.
Figure 5:
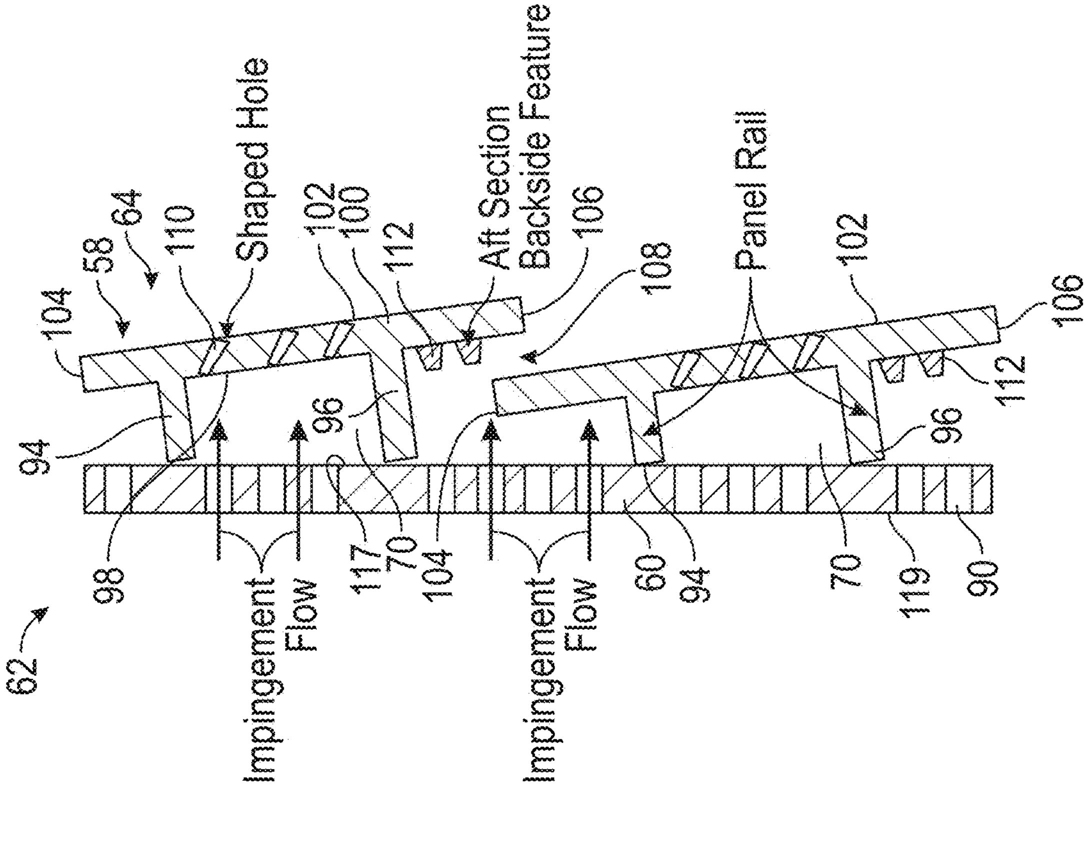
FIG. 5 is a cross-sectional view of a portion of a combustor of the gas turbine engine in accordance with the present disclosure illustrating impingement flow.
Figure 9:
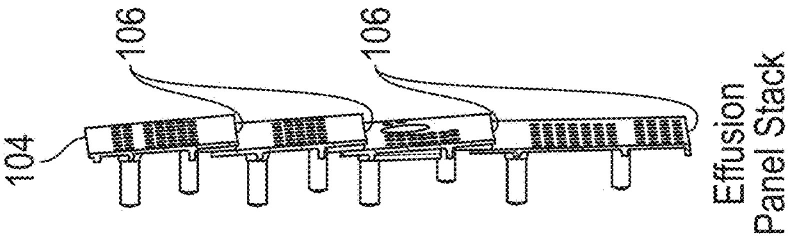
FIG. 9 is a side view of the plurality of heat shields illustrated in FIG. 8.
Figure 8:
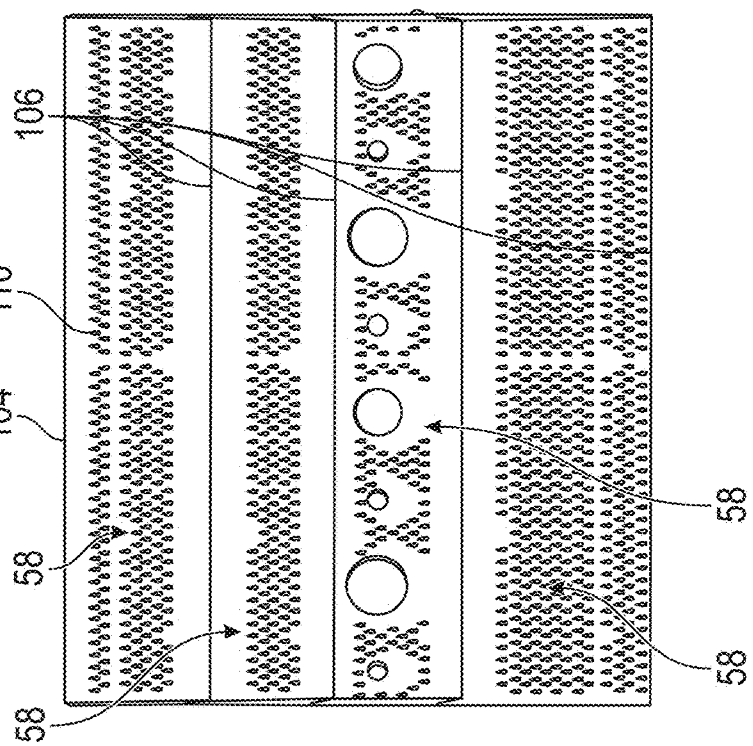
FIG. 8 is a view of a plurality of heat shields in accordance with the present disclosure.

Referring now to at least FIGS. 5 and 6, the assembly 62 of the present disclosure provides both slot and effusion cooling to create a robust film layer to protect the combustor panels or heat shields 58 from hot gases. The slot cooling is provided by cooling air that passes through gap 108 while the effusion cooling is provided by cooling air that passes through openings 110. In addition, an improved film cooling is provided on the portion of the combustor panel or heat shield 58 located downstream from the openings 110, which corresponds to the inner surface 102 located opposite to the plurality of cooling pins 112. The slot cooling is illustrated by bracket 118. The effusion cooling is illustrated by bracket 120. The improved film cooling is illustrated via bracket 122. In addition and by using variable height rails (e.g., first forward rail 94 and second rearward rail 96) cross flow of the cooling air is promoted which minimizes dirt or particulate deposition. In addition, the plurality of pins or protrusions 112 augment back side heat transfer augmentation wherein the inner side 102 of the panel 100 is cooled. It being understood that while FIGS. 5 and 6 are orientated vertically, the heat shields 58 and combustor liner 60 extend axially as illustrated in at least FIG. 2.

As such, the heat shield 58 configuration promotes formation of a robust film on the hot side of the heat shield 58 first fed through slots 108 (gap between panels) and later replenished by effusion holes 110 while backside features (e.g., a dense pin-fin array 114) promote cold side heat transfer augmentation. Moreover and as mentioned above, variable height rails promote cross flow to minimize dirt deposition.

The inner surface 102 of the heat shield panels 58 is oriented towards the combustion area 78 of the combustion chamber 76 and the outer surface 98 of the heat shield is opposite the inner surface 102. The outer surface 98 of the heat shield panels 58 is orientated towards the first or inner surface 117 of the combustor liner 60 and a second surface 119 of the combustor liner 60 is opposite to the first or inner surface 117 of the combustor liner 60. The second surface 119 of the combustor liner 60 is oriented radially outward from the combustor 56.

Figure 13:
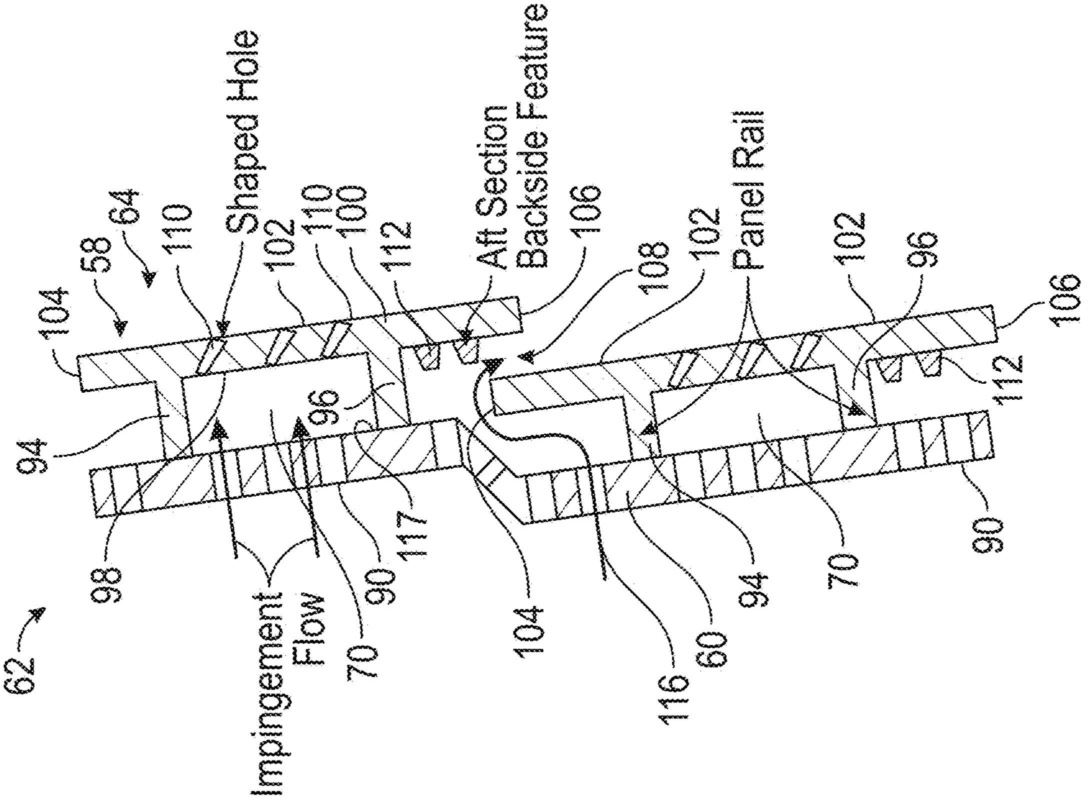
FIG. 13 is a cross-sectional view of a portion of a combustor of the gas turbine engine in accordance with another embodiment of the present disclosure.

Referring now to FIG. 13 an alternative embodiment of the present disclosure is illustrated. Here, the combustor liner 60 is configured to have a staggered shape such that the combustor liner 60 has a staggered surface of varying heights to which the plurality of heat shield panels are secured to and the first forward rail 94 and the second rearward rail 96 both extend the same distance from the outer surface 98 of the heat shield 58 in a radial direction. However and since the surface of the liner 60 is staggered to have varying heights, the forward end 104 of the panel portion 100 of a heat shield 58 is axially forward of the rearward end 106 of an adjacent heat shield 58 when they are secured to the staggered liner 60 via attachment mechanisms 74 (not shown in FIG. 13) such that the gap 108 is defined between the outer surface 98 of the panel portion 100 of one heat shield 58 and an inner surface 102 of the panel portion 100 of an adjacent heat shield 58. As such, cooling air travelling through openings 90 will pass around end 104, cool pins 112 and will also provide slot film cooling to the surface 102 of the heat shield 58 proximate to end 106. In addition and in this configuration, the gap or slot 108 is parallel to the surface 102 proximate to the end 104 so that the slot film cooling will occur and the slot film cooling is reinforced with the effusion cooling via openings 110. It being understood that the other features or combinations thereof, other than the first forward rail 94 and the second rearward rail 96 being of different heights, may be incorporated into the embodiment illustrated in at least FIG. 13.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An assembly for a combustor for a gas turbine engine, comprising:

a plurality of heat shield panels attached to at least one combustor liner, each one of the plurality of heat shield panels including a panel portion and a first forward rail and a second rearward rail each extending from an outer surface of the panel portion, the panel portion including an inner surface opposite of the outer surface, the panel portion also includes a forward end and a rearward end, the forward end of the panel portion is axially forward of the rearward end of an adjacent heat shield panel of the plurality of heat shield panels such that a gap is defined between the outer surface of the panel portion of one heat shield panel of the plurality of heat shield panels and an inner surface of the panel portion of an adjacent heat shield panel of the plurality of heat shield panels, the panel portion also includes a plurality of apertures extending from the outer surface to the inner surface; a plurality of cooling pins extending upwardly and away from the outer surface towards a surface of the at least one combustor liner, the plurality of cooling pins being located rearward of the second rearward rail; a plurality of effusion holes extending from the outer surface of the panel portion to the inner surface of the panel portion, the plurality of effusion holes extending from the outer surface of the panel portion to the inner surface of the panel portion in an area between the first forward rail and a second rearward rail, the plurality of effusion holes including effusion outlets located in the inner surface of the panel portion; and wherein the plurality of cooling pins are not located forward of the second rearward rail such that slot cooling is provided to the inner surface of the panel portion forward of the first forward rail and effusion cooling is provided to the inner surface of the panel portion rearward of the first forward rail and forward of the second rearward rail, and film cooling is provided to the inner surface of the panel portion rearward of the second rearward rail.

2. The assembly as in claim 1, wherein the at least one combustor liner is formed from any one the following metals: nickel (Ni), aluminum (Al), titanium (Ti), steel, cobalt (Co) and/or an alloy of one the foregoing metals.

3. The assembly as in claim 1, wherein the plurality of heat shield panels form a shingled and/or stepped hollow dual-walled structure.

4. The assembly as in claim 1, wherein the at least one combustor liner is formed from a ceramic matrix composite (CMC) material.

5. The assembly as in claim 1, wherein the plurality of heat shield panels and the at least one combustor liner extend circumferentially about a central longitudinal axis of a gas turbine engine.

6. The assembly as in claim 1, wherein the plurality of heat shield panels are removably mounted to the at least one combustor liner by one or more attachment mechanisms.

7. The assembly as in claim 6, wherein the one or more attachment mechanisms are integrally formed with a respective one of the plurality of heat shield panels.

8. The assembly as in claim 1, wherein the combustor defines a combustion chamber, the combustion chamber includes a combustion area within the combustion chamber, the plurality of heat shield panels partially enclose the combustion area within the combustion chamber of the combustor.

9. The assembly as in claim 1, wherein the first forward rail is located rearward from the forward end and the second rearward rail is located forward from the rearward end.

10. The assembly as in claim 9, wherein the first forward rail is located closer to the forward end than the second rearward rail and the second rearward rail is located closer to the rearward end than the first forward rail.

11. The assembly as in claim 1, wherein the first forward rail and the second rearward rail are formed integrally with each heat shield panel of the plurality of heat shield panels such that they are formed as a single unitary structure.

12. The assembly as in claim 1, wherein the first forward rail and the second rearward rail are interconnected by side rails that extend axially along the panel portion.

13. The assembly as in claim 12, wherein the side rails are located at peripheral edge portions of the panel portion.

14. The assembly as in claim 1, wherein the at least one combustor liner has a staggered surface of varying heights to which the plurality of heat shield panels are secured.

15. The assembly as in claim 1, wherein the second rearward rail extends further from the outer surface of the panel portion in a radial direction than the first forward rail such that when each one of the plurality of heat shield panels is secured to the at least one liner the panel portion is inclined with respect to the at least one liner such that the rearward end of the panel portion is further from the liner than the forward end of the panel portion.

16. The assembly as in claim 1, wherein the plurality of cooling pins do not extend all the way to an inner surface of the at least one combustor liner.

17. A gas turbine engine, comprising:

a compressor section;

a combustor fluidly connected to the compressor section;

a turbine section fluidly connected to the combustor, the combustor comprising:

an assembly, comprising:

a plurality of heat shield panels attached to at least one combustor liner, each one of the plurality of heat shield panels including a panel portion and a first forward rail and a second rearward rail each extending from an outer surface of the panel portion, the panel portion including an inner surface opposite of the outer surface, the panel portion also includes a forward end and a rearward end, the forward end of the panel portion is axially forward of the rearward end of an adjacent heat shield panel of the plurality of heat shield panels such that a gap is defined between the outer surface of the panel portion of one heat shield panel of the plurality of heat shield panels and an inner surface of the panel portion of an adjacent heat shield panel of the plurality of heat shield panels, the panel portion also includes a plurality of apertures extending from the outer surface to the inner surface; a plurality of cooling pins extending upwardly and away from the outer surface towards a surface of the at least one combustor liner, the plurality of cooling pins being located rearward of the second rearward rail; a plurality of effusion holes extending from the outer surface of the panel portion to the inner surface of the panel portion, the plurality of effusion holes extending from the outer surface of the panel portion to the inner surface of the panel portion in an area between the first forward rail and a second rearward rail, the plurality of effusion holes including effusion outlets located in the inner surface of the panel portion; and wherein the plurality of cooling pins are not located forward of the second rearward rail such that slot cooling is provided to the inner surface of the panel portion forward of the first forward rail and effusion cooling is provided to the inner surface of the panel portion rearward of the first forward rail and forward of the second rearward rail, and film cooling is provided to the inner surface of the panel portion rearward of the second rearward rail.

18. The gas turbine engine as in claim 17, wherein the plurality of heat shield panels and the at least one combustor liner extend circumferentially about a central longitudinal axis of a gas turbine engine and the second rearward rail extends further from the outer surface of the panel portion in a radial direction than the first forward rail such that when each one of the plurality of heat shield panels is secured to the at least one liner the panel portion is inclined with respect to the at least one liner such that the rearward end of the panel portion is further from the liner than the rearward end of the panel portion.

19. A method for cooling an inner surface of a heat shield of a combustor of a gas turbine engine, comprising:

securing a plurality of heat shield panels to at least one combustor liner of the combustor to form the heat shield, each one of the plurality of heat shield panels including a panel portion and a first forward rail and a second rearward rail each extending from an outer surface of the panel portion, the panel portion including an inner surface opposite of the outer surface, the panel portion also includes a forward end and a rearward end, the forward end of the panel portion is axially forward of the rearward end of an adjacent heat shield panel of the plurality of heat shield panels such that a gap is defined between the outer surface of the panel portion of one heat shield panel of the plurality of heat shield panels and an inner surface of the panel portion of an adjacent heat shield panel of the plurality of heat shield panels, the panel portion also includes a plurality of apertures extending from the outer surface to the inner surface; a plurality of cooling pins extending upwardly and away from the outer surface towards a surface of the at least one combustor liner, the plurality of cooling pins being located rearward of the second rearward rail; a plurality of effusion holes extending from the outer surface of the panel portion to the inner surface of the panel portion, the plurality of effusion holes extending from the outer surface of the panel portion to the inner surface of the panel portion in an area between the first forward rail and a second rearward rail, the plurality of effusion holes including effusion outlets located in the inner surface of the panel portion; and wherein the plurality of cooling pins are not located forward of the second rearward rail such that slot cooling is provided to the inner surface of the panel portion forward of the first forward rail and effusion cooling is provided to the inner surface of the panel portion rearward of the first forward rail and forward of the second rearward rail, and film cooling is provided to the inner surface of the panel portion rearward of the second rearward rail.

* * * * *